United States Patent [19]

Fagan

[11] Patent Number: 5,011,617

[45] Date of Patent: Apr. 30, 1991

[54] COMPLEX TOLYLENE POLUREA GREASE COMPOSITION AND PROCESS

[75] Inventor: Gian L. Fagan, Benicia, Calif.

[73] Assignee: Chevron Research and Technology Company, San Francisco, Calif.

[21] Appl. No.: 478,130

[22] Filed: Feb. 9, 1990

[51] Int. Cl.$^5$ .............................................. C10M 1/10
[52] U.S. Cl. ........................................ 252/18; 252/25;
252/51.5 A; 252/51.5 R
[58] Field of Search ...................... 252/18, 25, 51.5 A, 252/51.5 R

[56] References Cited

U.S. PATENT DOCUMENTS

| 3,242,210 | 3/1966 | Dreher | 252/51.5 A |
| 3,243,372 | 3/1966 | Dreher et al. | 252/51.5 A |
| 3,846,314 | 11/1974 | Dreher et al. | 252/25 |
| 3,846,315 | 11/1974 | Stanton et al. | 252/25 |
| 3,920,571 | 11/1975 | Crocker | 252/51 AA |
| 4,759,859 | 7/1988 | Waynick | 252/18 |
| 4,787,992 | 11/1988 | Waynick | 252/18 |

FOREIGN PATENT DOCUMENTS 59-199797 12/1984 Japan .

Primary Examiner—Margaret B. Medley
Attorney, Agent, or Firm—R. C. Gaffney; J. J. DeYoung

[57] ABSTRACT

Disclosed is complex tolylene polyurea-thickened grease containing less than 7 parts per million 2,4-diaminotoluene and a process for making said grease comprising reacting an isocyanate, a polyamine and monoamine with a major portion of a lubricating oil and thereafter adding an alkaline earth metal oxide or hydroxide and a carboxylic acid anhydride containing 2 to 20 carbon atoms to said mixture and thereafter milling said mixture to the consistency of grease.

27 Claims, No Drawings

COMPLEX TOLYLENE POLUREA GREASE COMPOSITION AND PROCESS

BACKGROUND OF THE INVENTION

This application relates to improved complex tolylene polyurea-thickened grease compositions containing less than 7 parts per million 2,4-diaminotoluene. The application also relates to a process for making complex tolylene polyurea-thickened grease compositions containing less than parts per million 2,4-diaminotoluene wherein an anhydride is one of the reactants.

Polyurea-thickened greases are well known in the art. See, for example, U.S. Pat. Nos. 3,242,210 and 3,243,372, the entire disclosures of which are incorporated herein by reference.

In the past alkaline earth metal carboxylates and alkaline earth metal carbonates have been utilized with polyurea-thickened greases as taught in U.S. Pat. Nos. 3,846,314 and 3,920,571. Polyurea-thickened greases containing these alkaline earth metal additives are known as complex polyurea-thickened greases.

It has been found that complex tolylene polyurea-thickened greases contain significant amounts of 2,4-diaminotoluene, generally averaging greater than 8 ppm and frequently in the range of 20 to 200 ppm or more. It has furthermore been found that 2,4-diaminotoluene causes cancer in laboratory animals.

Japan Kokai Pat. SHO 59-199797 (1984) discloses the use of an anhydride in the preparation of a lithium soap grease with a high drop point. This patent teaches a method of using acetyl chloride or acetic anhydride to react with the hydroxyl groups in the lithium soap grease to improve flow properties of the grease.

One object of the present invention is to produce a complex tolylene polyurea-thickened grease containing essentially no detectable 2,4-diaminotoluene.

Other objects will be readily apparent to those skilled in the art from a reading of this specification.

SUMMARY OF THE INVENTION

Disclosed is a process for making and a composition comprising a complex tolylene polyurea-thickened grease containing less than 7 parts per million 2,4-diaminotoluene.

DETAILED DESCRIPTION OF THE INVENTION

The present invention is an improvement over the inventions disclosed in the aforementioned U.S. Pat. Nos. 3,846,314 and 3,920,571, the entire disclosures of which are incorporated herein by reference.

It has been found that complex tolylene polyurea-thickened greases can be formed containing essentially no detectable 2,4-diaminotoluene. The 2,4-diaminotoluene content in the composition of the present invention is less than 7 parts per million and preferably less than 5 parts per million. Most preferably the grease contains no detectable 2,4-diaminotoluene.

In U.S. Pat. No. 3,846,314 it is taught at col. 7, lines 51 through 63 to add an alkaline earth metal hydroxide or oxide and a carboxylic acid to the polyurea-thickened grease along with heating at a temperature of 70° to 150° F. Typically the metal hydroxide is calcium hydroxide and the carboxylic acid is acetic acid. During the reaction, water is released and removed by applying sufficient vacuum and heat. Without being bound by the theory, it is believed that the heating of the tolylene polyurea-thickened grease to remove the water leads to the formation of 2,4-diaminotoluene by the degradation of a limited amount of the tolylene polyurea gellant.

U.S. Pat. No. 3,920,571 contains a teaching similar to that of U.S. Pat. No. 3,846,314 discussed above. At col 8, lines 20 to 39 the formation of a complex tolylene polyurea-thickened grease is taught along with the addition of carbon dioxide to the reaction mixture forming a carbonate additive. Again, water is released during the reaction and is removed by applying sufficient vacuum and heat.

In the present invention, the formation of 2,4-diaminotoluene is believed avoided by the elimination of the high temperature water removal step by the use of different reactants. In the present invention an alkaline earth metal oxide (or hydroxide) is reacted with a lower molecular weight carboxylic acid anhydride thereby avoiding or minimizing the formation of water in the reaction.

Suitable lower molecular weight carboxylic acid anhydrides, referred to herein as anhydrides, include anhydrides containing 2 to 20 carbon atoms, and preferably 2 to 6 carbon atoms. Anhydrides can be added or formed in situ.

Representative anhydrides include formic anhydride; dialkyl anhydrides such as acetic anhydride, propionic anhydride, butyric anhydride, valeric anhydride, caproic anhydride, and crotonic anhydride; mixed alkyl anhydrides, such as formic acetic anhydride and acetic butyric anhydride; cyclic anhydrides, such as succinic anhydride, maleic anhydride, and methyl succinic anhydride; aromatic anhydrides such as phthalic anhydride and benzoic anhydride; or mixed alkyl, cyclic, or aromatic anhydrides. Most preferably, the anhydride is acetic anhydride.

Any of the alkaline earth metals can be employed herein, for example, magnesium, calcium, strontium, barium, etc. However, calcium is the most preferred.

In addition to containing less than 7 parts per million 2,4-diaminotoluene, the grease composition of the present invention also comprises the combination of at least three components: (1) a lubricating oil base vehicle, (2) a tolylene-containing polyurea gellant or mixture of tolylene-containing and non-tolylene-containing polyurea gellants, and (3) an alkaline earth metal carbonate or carboxylate.

The lubricating oil base vehicle and the polyurea gellant are well known in the art. Any lubricating oil base vehicle commonly used in greases can be used. Generally, the base vehicle will comprise 50 to 99 weight percent of the final grease composition. The base vehicles are most commonly petroleum oils or synthetic base oils.

The polyurea gellant component for use in the present combination is also well known in the grease art and may be prepared by conventional means. For example, U.S. Pat. No 3,242,210 describes the preparation of polyurea-thickened greases suitable for use in the composition of the present invention, and its disclosure is incorporated herein by reference. The polyurea is used in an amount sufficient to thicken the base vehicle to grease consistency. When used as a gellant, the polyureas are normally present in an amount of at least about 0.5 weight percent and more usually from about 1 to 25 or more weight percent. Most preferably the polyureas are present in an amount of from about 3 to 9 or more weight percent. Well-known polyurea-thickened greases contain polyureas of the following formula:

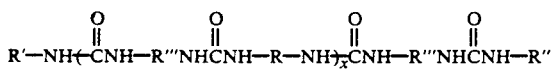

wherein x is an integer of from 0 to 3, R and R''' may be the same or different and are hydrocarbylene of from 2 to 30 carbon atoms (hydrocarbylene is a divalent organic radical composed solely of carbon and hydrogen which may be aliphatic, alicyclic or aromatic or combinations thereof, e.g., alkaryl, aralkyl, etc., having its two free valences on different carbon atoms); R' and R'' may be the same or different and are hydrocarbyl of from 1 to 30 carbon atoms (hydrocarbyl is a monovalent organic radical composed solely of carbon and hydrogen which may be aliphatic, aromatic, or alicyclic or combinations thereof, e.g., aralkyl, alkaryl, etc.).

Tolylene polyurea-thickened greases are as set forth in formula I, above, wherein at least one R''' is tolylene. By tolylene it is meant a divalent organic radical having its two free valences on different carbon atoms of a methylbenzene moiety. For example, "2,4-tolylene" refers to:

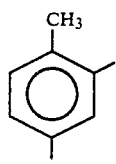

The polyureas of the above formula are readily prepared by mixing diisocyanates and diamines with monoisocyanates or monoamines in the proper proportions to form the desired polyurea. The greases thickened with the polyureas are useful at temperatures from about 100° F. to 500° F. and remain unctuous after long use, not becoming hard or brittle. The grease compositions thus formed are extremely resistant to emulsification in water.

The preferred greases are thickened by compositions of the following formula:

wherein x is an integer of from 1 to 3, preferably 1, $R^a$ and $R^d$ are the same or different and are hydrocarbyl of from 5 to 28 carbon atoms, preferably of from 6 to 25 carbon atoms and $R^b$ and $R^c$ may be the same or different and will be hydrocarbylene of from 2 to 26 carbon atoms, more usually of from 2 to 18 carbon atoms. It is further preferred that in the tetraureas, the sum of the carbon atoms of $R^a$ and $R^d$ is in the range of 10 to 30 and the sum of the carbon atoms of $R^b$ and $R^c$ is in the range of 12 to 40.

The monoamine or monoisocyanate used in the formation of the polyurea will form the terminal end group. As already indicated, these terminal end groups will be of from 1 to 30 carbon atoms, but are preferably of from 5 to 28 carbon atoms and more desirably of from 6 to 25 carbon atoms. As already indicated, the substituent on the nitrogen is a hydrocarbon radical which may be aliphatic, aromatic or alicyclic. The hydrocarbon radical may be aliphatically saturated or unsaturated or may be combinations of the various types of hydrocarbon radicals.

The third essential component is an alkaline earth metal carboxylate or optionally a mixture of the carboxylate and a carbonate. Particularly preferred carboxylates are the alkaline earth metal aliphatic monocarboxylates having from 1 to 3 carbon atoms. Any of the alkaline earth metals can be employed herein, for example, magnesium, calcium, strontium, barium, etc. However, calcium is the most preferred. The carboxylate group preferably has from 1 to 3 carbon atoms and more preferably 2 carbon atoms. Exemplary carboxylates which may be successfully employed herein include calcium formate, barium formate, magnesium formate, magnesium acetate, calcium acetate, strontium acetate, barium acetate, calcium propionate, barium propionate, magnesium propionate, etc.

The alkaline earth metal carbonates can also be utilized in combination with the carboxylate and any of the alkaline earth metals can be employed, for example, magnesium, calcium, strontium, barium, etc. however, calcium is the most preferred carbonate. Exemplary compounds which may be employed include calcium carbonate, barium carbonate, and magnesium carbonate.

The amount of alkaline earth metal carboxylate and optionally carbonate present within the grease composition may vary depending upon the lubricating property desired, the particular mono- or polyurea constituent selected, the type of alkaline earth metal carboxylate or carbonate selected, etc. However, generally the metal carbonate or mixture of metal carboxylate and carbonate will range from 3 to 30 weight percent of the final grease composition and preferably between about 4 and 15 weight percent. The ratio of alkaline earth metal carboxylate or optionally metal carbonate/carboxylate to the mono-or polyurea constituent will also vary depending upon the aforementioned conditions, but will generally range on a weight basis from 0.1 to 20 parts of metal carbonate/carboxylate per part of mono- and polyurea, preferably from 1 to 10 parts of mono- and polyurea, and preferably from 3 to 7 parts per part of mono- and polyurea. (If there is no monourea present, then only the polyurea is used to calculate the ratios.)

A concentrate of the mono- or polyurea thickener and metal carboxylate or carbonate can be formulated. The concentration of the metal carboxylates/carbonates can vary from 20 to 50 weight percent, preferably from 25 to 40 weight percent of the concentrate. The base oil is the preferred liquid medium of the concentrate, since it can be readily diluted to form the desired grease composition.

Preparation of the Grease Composition

The greases of the present invention are preferably prepared by the in situ production of the tolylene mono- or polyurea thickener followed by the in situ production of the alkaline earth metal carboxylate or carbonate within the base oil.

In this embodiment the base oil is charged to the grease kettle along with the tolylene mono- or polyurea precursors and thereafter the metal carboxylate/carbonate precursors, i.e., the reactants, combine to form the tolylene mono- or polyurea thickener and the metal carboxylate/carbonate.

After the formation of the tolylene mono- or polyurea compound, the grease kettle is charged with an alkaline earth metal oxide (or hydroxide) and an anhydride and a small amount of water promoter. Carbon dioxide can also be added in addition to the anhydride to react with part of the metal oxide or hydroxide to form the carbonate. Sufficient water is added to promote the reaction. Generally the metal oxide (or hydroxide) to water ratio on an equivalent basis will be in the range of 0.1 to 10:1, preferably between 1 and 5:1. The ratio of alkaline earth metal oxide to anhydride on an equivalent basis can vary from 1 to 4:1 and is preferably between 1 and 2:1. When making the carbonate, the amount of carbon dioxide introduced into the solution may vary from 0.1 to 10 molar parts per molar part of alkaline earth metal oxide and preferably from 0.5 to 0.9 molar parts per molar part of alkaline earth metal oxide. The kettle is maintained at a temperature between 70° F. and 150° F. to form the carboxylate or carbonate.

One preferred method of preparation comprises:

(1) mixing a $C_4$ to $C_{32}$ diisocyanate, a $C_2$ to $C_{40}$ polyamine and a $C_1$ to $C_{30}$ monoamine with a major portion of a lubricating oil, the molar ratio of diisocyanate to polyamine to monoamine being 1:0-2:0.1-2;

(2) maintaining said mixture at a temperature of 60° to 320° F. for a period of 0.5 to 10 hours;

(3) thereafter adding an alkaline earth metal oxide and $C_2$ to $C_{20}$ anhydride and a promoting amount of water to said mixture; and (4) thereafter milling said mixture to the consistency of grease Preferably the anhydride is $C_2$ to $C_6$ anhydride and said alkaline earth metal oxide is calcium oxide.

In addition to the above, several other grease additives may be employed in the practice of this invention and include stabilizers; tackiness agents; dropping point improvers; lubricating agents; color correctors; odor control agents; rust inhibitors, such as alkali metal nitrites, for example sodium nitrite; extreme pressure agents, etc.

2,4-diaminotoluene Analysis

The following procedure was utilized for determining the quantity of 2,4-diaminotoluene in the grease composition of the present invention and the following examples.

A combined gas chromatography-mass spectrometry (GC-MS) method was used for the analysis of 2,4 -diaminotoluene. In the gas chromatograph, the 2,4-diaminotoluene isomer is not resolved from the 2,6-diaminotoluene isomer. For that reason this analysis reports a "worst-case" level (that is, the level for the sum of 2,4-diaminotoluene and 2,6-diaminotoluene is reported as the 2,4-diaminotoluene isomer). Mass spectrometry detection was chosen to reduce detection limits to the 1 part-per-million (ppm) or lower.

A sample of tolylene polyurea-thickened grease is prepared for analysis by dissolving about 1 gram of grease in 25 mL of o-xylene. Either 3,4-diaminotoluene and/or 2,6-dichloro toluene is added to the solvent as internal standard(s) and the sample is vortex mixed for about 5 minutes. Solids in the solution are removed by centrifuging for 30 minutes. An aliquot of the resulting sample is sealed in an auto-sampler vial to await analysis.

A Hewlett-Packard model 5890 gas chromatograph is used for the analysis It is outfitted with a 60 meter, 0.32 mm I.D. bonded methylsilicone capillary column (J & W Scientific, DB-1). The injection port is maintained at a temperature of 50° C. The gas chromatograph column is programmed from 100° C. to 170° C. at 4° C. per minute with a one minute hold at the higher temperature. A 1 microLiter aliquot of sample is injected.

A Finnigan model 4000 mass spectrometers ITD, was used for this analysis. The following description for the Finnigan ITD is typical. The mass spectrometer is operated at 70 eV with a multiplier gain of about $10^6$. Multiple ion detection is used to maximize sensitivity. The following ions are needed for the analysis:

160 dalton - internal std.
121+122 dalton - quantitation ions for 2,4-diaminotoluene
94 dalton - confirmation ion for 2,4-diaminotoluene
106 dalton - confirmation ion for 2,4-diaminotoluene The presence of ions at 94 and 106 daltons is required for identity confirmation. That is, the ions at 94, 106, 121, and 122 must all be present and should all have about the same peak shape to confirm the presence of 2,4-diaminotoluene. The detection limit of the method is 1 ppm or less, depending upon the level of chemical interferences in the sample. The reporting limit for this method is 5 ppm or less.

For the purposes of this analysis, the mass spectrometer was considered a specific detector for the gas chromatograph. Quantitative data is obtained by measuring the area of:

the 160 dalton mass chromatogram peak (for 2,6-dichloro toluene)
the 121+122 dalton mass chromatogram peak (for 3,4-diaminotoluene)
the 121+122 dalton mass chromatogram peak (for 2,4-diaminotoluene)

A calibration curve is developed from a series of standards containing known but varied concentrations of 2,4-diaminotoluene compared to a fixed concentration of both 2,6-dichloro toluene and 3,4-diaminotoluene. Each sample is prepared to the same fixed concentration of 2,6-diaminotoluene and 3,4-diaminotoluene. The ratio of the 2,4-diaminotoluene to the internal standard is compared to the calibration curve to obtain the concentration of 2,4-diaminotoluene in that sample.

The following examples are presented to illustrate the practice of specific embodiments of this invention and should not be interpreted as limitations upon the scope of the invention. Unless indicated otherwise all parts are parts by weight.

EXAMPLES

EXAMPLE 1

(Prior Art U.S. Pat. No. 3,846,314)

A polyurea-thickened grease composition was prepared substantially following Example #2 of U.S. Pat. No. 3,846,314. To a stirred mixer containing a solution of 4070 parts of base oil, 60 parts of ethylene diamine, and 541 parts of oleylamine, were charged a mixture of 337 parts of toluene diisocyanate with 1480 parts base oil at 180° F. The combined mixture was heated to 240° F. to complete formation of the polyurea. After cooling to 180° F., 1536 parts of calcium hydroxide and 2664 parts of base oil were added. Next, 1110 parts of base oil were added. 1728 parts of acetic acid were then added over a period of about 50 minutes. After adding an aqueous solution of rust inhibitor, the temperature was increased to 240° F. for 15 minutes to remove water. 4550 parts of oil were added, and the mixture was milled in an extrusion type mill under elevated pressure. After adding additional rust inhibitor and dye, followed by an additional period of milling, the final grease was found to contain 60 ppm 2,4-diaminotoluene.

EXAMPLE 2

In a stirred mixture, a solution of 117 parts of polyurea prepared in essentially the same manner as described in Example 1 in 791 parts of base oil containing an antioxidant was heated to 180° F., 140 parts of calcium oxide and 13.9 parts water were added. One hundred seventy-six parts of acetic anhydride were then added over 45 minutes, followed by rust inhibitors and dye. Finally, additional oil was added to reach a worked penetration of 315 after passing through a 3-roll mill. The final grease was found to contain no detectable 2,4-diaminotoluene.

Comparison of Examples 1 and 2 show that complex tolylene polyurea-thickened greases can be made in accordance with the present invention which contain essentially no detectable 2,4-diaminotoluene by using a lower molecular weight anhydride as a reactant instead of lower molecular weight acid and thereby avoiding the high temperature removal of water as shown in Example 1 and 2.

As will be evident to those skilled in the art, various modifications of this invention can be made or followed, in light of the foregoing disclosure and discussion, without departing from the spirit or scope of the disclosure or from the scope of the following claims.

What is claimed is:

1. A complex tolylene polyurea-thickened grease containing less than 7 parts per million 2,4-diaminotoluene.

2. The complex tolylene polyurea-thickened grease composition of claim 1 containing less than 5 parts per million 2,4-diaminotoluene.

3. The complex tolylene polyurea-thickened grease composition of claim 2 containing no detectable 2,4-diaminotoluene.

4. The complex tolylene polyurea-thickened grease composition of claim 2 wherein said grease contains calcium acetate.

5. The complex tolylene polyurea-thickened grease composition of claim 2 wherein said grease contains calcium acetate and calcium carbonate.

6. A grease composition comprising a major amount of a lubricating oil, a tolylene polyurea gellant in an amount sufficient to thicken the lubricating oil to grease consistency, and from 4 to 15 weight percent of an alkaline earth metal aliphatic monocarboxylate having from 1 to 3 carbons wherein the weight ratio of alkaline earth metal carboxylate to polyurea gellant compound is from 1 to 10 and wherein said grease composition contains less than 7 parts per million 2,4-diaminotoluene.

7. The composition of claim 6 wherein said alkaline earth metal aliphatic monocarboxylate is calcium acetate.

8. The grease composition of claim 7 wherein said tolylene polyurea gellant has the following formula:

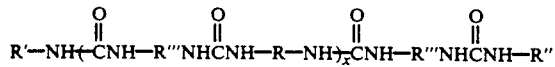

wherein x is a number having the value from 0 to 3, R' and R" are hydrocarbon radicals containing 1 to 30 carbon atoms, R and R''' are hydrocarbon radicals containing from 2 to 30 carbon atoms wherein the ratio of carbon atoms to the number of urea groups is at least 6 to 1.

9. A grease composition comprising a major amount of a lubricating oil, a tolylene polyurea gellant in an amount 1 to 25 weight percent wherein said polyurea has the following formula:

wherein x is an integer of from 1 to 3, $R^a$ and $R^d$ are the same or different and are hydrocarbyl of from 5 to 28 carbon atoms, and $R^b$ and $R^c$ may be the same or different and will be hydrocarbylene of from 2 to 26 carbon atoms, and from 4 to 15 weight percent of a calcium carboxylate, and wherein said grease composition contains less than 5 parts per million 2,4-diaminotoluene.

10. The complex tolylene polyurea-thickened grease composition of claim 9 wherein said grease also contains from 10 to 20 weight percent calcium carbonate.

11. The complex tolylene polyurea-thickened grease composition of claim 9 containing no detectable 2,4-diaminotoluene.

12. A method for preparing a grease composition which comprises:
mixing a diisocyanate containing 4 to 32 carbon atoms, a polyamine containing 2 to 40 carbon atoms and a monoamine containing 1 to 30 carbon atoms with a major portion of a lubricating oil, the molar ratio of diisocyanate to polyamine to monoamine being 1:0–2:0.1–2;
maintaining said mixture at a temperature of 60° to 320° F. for a period of 0.5 to 10 hours;
thereafter adding an alkaline earth metal oxide or hydroxide, a carboxylic acid anhydride containing 2 to 20 carbon atoms and a promoting amount of water to said mixture;
thereafter milling said mixture to the consistency of grease.

13. The process of claim 12 wherein said anhydride contains 2 to 6 carbon atoms and said alkaline earth metal oxide is calcium oxide.

14. The process of claim 12 wherein said anhydride is acetic anhydride.

15. A grease composition comprising a major portion of an oil of lubricating viscosity, from 3 to 30 weight percent of an alkaline earth metal carbonate or mixtures of an alkaline earth metal carbonate and carboxylate and a polyurea compound wherein said grease composition is prepared by reacting the following components:
(1) mixing a diisocyanate containing 4 to 32 carbon atoms, a polyamine containing 2 to 40 carbon atoms and a monoamine containing 1 to 30 carbon atoms with a major portion of a lubricating oil, the molar ratio of diisocyanate to polyamine to monoamine being 1:0–2:0.1–2;
(2) maintaining said mixture at a temperature of 60° to 320° F. for a period of 0.5 to 10 hours;
(3) thereafter adding an alkaline earth metal oxide or hydroxide and a carboxylic acid anhydride containing 2 to 20 carbon atoms and a promoting amount of water to said mixture, and optionally carbon dioxide; and
(4) thereafter milling said mixture to the consistency of grease.

16. The composition defined in claim 15 wherein said diisocyanate is tolylene diisocyanate, said polyamine is ethylene diamine, said monofunctional compound is a monoamine containing 12 to 24 carbon atoms, said anhydride contains 2 to 6 carbon atoms and said alkaline earth metal is an alkaline earth metal oxide.

17. The composition defined in claim 16 wherein the molar ratio of diisocyanate to diamine to monoamine is 2:1:2 and said anhydride is acetic anhydride.

18. The composition defined in claim 17 wherein said monoamine is oleylamine.

19. The composition defined in claim 15 wherein said polyamine is a triamine, said anhydride contains 2 to 6 carbon atoms and said alkaline earth metal is an alkaline earth metal oxide.

20. The composition defined in claim 19 wherein said triamine is tert-N-methyl diethylenetriamine and said anhydride is acetic anhydride.

21. The composition defined in claim 15 wherein said polyamine is piperazine and said anhydride contains 2 to 6 carbon atoms.

22. The composition defined in claim 15 wherein said alkaline earth metal carbonate is calcium carbonate and said anhydride contains 2 to 6 carbon atoms.

23. The composition defined in claim 22 wherein said oil of lubricating viscosity is a naphthenic or paraffinic hydrocarbon lubricating oil or mixture thereof and said anhydride is acetic anhydride.

24. The composition defined in claim 23 wherein an alkali metal nitrite is also present.

25. The composition defined in claim 24 wherein said alkali metal nitrite is sodium nitrite.

26. The composition defined in claim 25 wherein said alkaline earth metal carbonate is calcium carbonate.

27. The composition defined in claim 26 wherein said monoamine is oleyl amine.

* * * * *